United States Patent
Atwood et al.

(10) Patent No.: US 6,978,441 B2
(45) Date of Patent: Dec. 20, 2005

(54) RATING APPARATUS AND METHOD FOR EVALUATING BUGS

(75) Inventors: Christopher A. Atwood, Santa Clara, CA (US); Yousef R. Yacoub, San Jose, CA (US); Eric R. Reid, Richland, MI (US); James C. Liu, Sunnyvale, CA (US); Angelo Rajadurai, Attleboro, MA (US); Prashant Srinivasan, Mountain View, CA (US); Mehdi Ghazizadeh, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 645 days.

(21) Appl. No.: 09/970,281

(22) Filed: Oct. 3, 2001

(65) Prior Publication Data

US 2003/0066049 A1    Apr. 3, 2003

(51) Int. Cl.[7] .............................................. G06F 9/44
(52) U.S. Cl. ..................................... 717/125; 717/126
(58) Field of Search ............ 717/124–135; 714/15–21, 714/47–54

(56) References Cited

U.S. PATENT DOCUMENTS

| | | | | |
|---|---|---|---|---|
| 5,737,727 A | * | 4/1998 | Lehmann et al. | 705/7 |
| 5,920,725 A | * | 7/1999 | Ma et al. | 717/171 |
| 6,701,519 B1 | * | 3/2004 | Cowan | 717/130 |

OTHER PUBLICATIONS

Wilson et al., "The whiteboard: Tracking usability issues: to bug or not to bug?", ACM, pp.: 15-19, Jun. 2001.*

* cited by examiner

*Primary Examiner*—Ted T. Vo
(74) *Attorney, Agent, or Firm*—Osha Liang LLP

(57) ABSTRACT

A method of rating a bug, including reporting the bug to a business entity by an interested party, entering information regarding the bug into a database, assigning a priority number for the bug, calculating a sigma number for the bug using the priority number, evaluating the bug to be fixed using the sigma number, and escalating the bug. A bug council rating apparatus, including a database to store the information entered using a graphical user interface, a priority number module configured to generate a priority number, and a sigma number module configured to generate a sigma number.

27 Claims, 8 Drawing Sheets

RATING APPARATUS AND METHOD FOR EVALUATING BUGS

BACKGROUND OF THE INVENTION

The process of developing software applications involves a structured approach designed to enhance the quality of the finished product. The structured approach to software application development involves a series of stages known as a software application development life cycle. There are several different implementations of the software application development life cycle, but in general, the process of software application development begins with analysis of the needs of an end user, such as a corporation, governmental entity, private individual, etc. The next stage involves designing the software application to meet the needs of the end user, after which the software application itself is created. After testing the software application, the software application is then sent to the end user. Corrective maintenance of, and improvements to, the software application may continue after sending the software application to the end user. Adherence to a structured approach of software application development decreases the number of flaws in the finished software application product.

A bug is generally defined as some flaw in the software application that causes all or some portion of the software application to malfunction or to perform in some unexpected fashion. As the commercial software application marketplace demands ever more powerful and feature-rich software applications, and as the complexity of software applications increases, the number of bugs increases. Although the structured approach to software application development is designed to prevent bugs, software application developers are not perfect and have a limited capacity to deal with complexity, and so therefore mistakes leading to bugs are inevitable. Many bugs are difficult to find and remain hidden until discovered by the end user.

In order to address the problem of bugs that exist in software which is already released to users, software manufacturers often release new versions of software applications in which bugs have been fixed. The users may then obtain the new versions. However, fixing bugs in software applications that have already been released is often costly.

In order to improve software application quality, software application manufacturers may employ bug-tracking systems. Bug-tracking systems help software application manufacturers find out what bugs are in the software application while the software application is being developed or tested prior to release, or after the software application has been released to the end user. Software application developers, software application testers, end users, or other interested parties may report bugs to the bug-tracking system by various means, such as telephone, email, etc. The software application manufacturer then collects reported software application bugs and stores the details of the reported bugs for analysis. Each bug is assigned a unique value, and the bug-tracking system thereby facilitates the fixing of bugs by allowing the software application manufacturer to monitor the progress of fixing the bug.

Independent Software Vendors (ISV's) are software application manufacturers that develop, or are involved with, software applications designed to enhance, improve upon, or work in conjunction with, other software applications developed by—or hardware developed by—another manufacturer. For example, an ISV may create an end user software applications designed to function on a certain computer operating system, such as a database management system meant to run on a computer operating system. ISV-created software applications is often referred to as "third party software applications." The abundant existence of third party software applications for a software application such as an operating system enhances the value of the operating system for the end user by providing the end user with more choice and functionality in third party software applications for the operating system.

The presence of bugs in the operating system may hinder the development of third party software applications for that operating system. Third party software applications developed specifically for some other software application, such as an operating system, is by nature dependent upon the design of the operating system. Bugs in the operating system may make development of third party software difficult, or may deter ISV's from developing third party software applications for the operating system because of the added cost of dealing with the bugs. Furthermore, bugs in the operating system may also result in lower performance, thereby making the operating system less attractive to users.

A downstream ISV develops third party software applications that depend upon or work in conjunction with other third party software applications developed at some other ISV. For example, an ISV (company "A") may develop a web browser designed to operate on a certain operating system. Another ISV (company "B") may develop a software application that depends upon or works in conjunction with the web browser. Company "B" is known as a "downstream ISV."

A bug advocate is a name given to employees of software application manufacturers appointed the task of eliminating bugs reported to the software application manufacturer by end users, in-house developers, developers working for ISV's, or other interested parties. The bug advocate, through the use of a bug-tracking system, follows through on some or all of the reported bugs, ensuring that bugs are rated and fixed. Thus, the use of the bug advocate and bug-tracking systems by software application manufacturers enhances the quality of the software application by facilitating the process of fixing bugs. Software application quality is enhanced by delivering a better product to the end user, and also by delivering better software applications to the ISV's. The ISV's are then better able to develop third party software applications, which, in turn, makes the software application more attractive to the end user by giving the end user more choice and functionality in third party software applications.

The foregoing statements regarding the problems of bugs in software application development also generally apply to other types of manufacturing besides software application manufacturing. For example, the manufacturers of computer hardware also address flaws in the finished product in order to facilitate the development of third party software applications meant to operate in conjunction with the computer hardware. Furthermore, any entity that creates a commercial product deals with the problems of quality control.

Java™ is a computer language designed by Sun Microsystems, Inc. ("Sun Microsystems", hereinafter) to allow creation of software applications to run on various computer platforms. Referring to FIG. 1, in order to create a Java™ software application, the developer first writes the software application in human-readable Java™ source code. As used herein, the term "software application" refers to Java™ 2 Standard Edition (J2SE™) software applications and Java™ "applets" which are essentially small software applications usually embedded in a web page. In the example shown, the software application "Program" (11) is created as a human-readable text file. The name of this text file is given the required five-character extension ".java." The Java™ compiler ("javac", "fastjavac", "jvc", et. al.) (13) is used to compile the source code into a platform independent bytecode (15). Upon compilation, the resulting binary file (15) will automatically receive the same file name as the source text file with ".class" extension or the same name of the source file plus a special character "$" plus the name of an inner class with the extension ".class."

The Java™ runtime environment incorporates a virtual machine (16) to verify whether a given bytecode (15) has the proper format (verification process) and convert the ".class" byte codes into actual machine executions (17). The machine executions (like drawing windows, buttons, and user prompt fields) will occur in accordance to the software application developer's code instructions. Because Sun Microsystems specifically designed the virtual machine (16) to run on different platforms, a single set of ".class" byte codes will execute on any platform where a virtual machine (16) has been installed. An Internet web browser such as Netscape® and Microsoft® Internet Explorer that incorporates a virtual machine (16) is called a "java-enabled" web browser. A discussion of the Java™ language itself is beyond the scope of this document. However, complete information regarding the Java™ programming language and the Java™ platform are available from Sun Microsystems both in print and via the Internet at http://wwwjava-.sun.com.

Servlets are software applications that run on a web server through the virtual machine. Servlets deliver HTML web pages to a web browser client. The web browser client requests HTML web pages from the server, and the servlet responds by creating an HTML web page, which the server sends back to the web browser client. Servlets allow the server to respond to deliver web pages dynamically, i.e., the content of the HTML web page may vary from client to client, the client web browser may interact with the servlet, etc. Thus, the servlet may create web pages based upon input from the user operating the web browser client. Examples of dynamic content are e-commerce applications, online tutorials, etc.

In order to respond dynamically to the web browser client, the servlet often makes use of a database. The database is a repository of information stored in computer memory, accessible to a variety of software applications. The servlet is connected to the database via a computer network; the web browser client is also connected to the server and servlet via a computer network. A typical sequence of operations is illustrated in FIG. 2. The web browser client (30) sends a request (32) to the server (34). The server (34) passes the request (32) to the appropriate servlet (36), which then performs needed processing. The servlet then interacts (37) with the database (38), either writing to or reading from the database (38). The server then responds (39) to the web browser client (30).

SUMMARY OF INVENTION

In general, in one aspect, the invention comprises a method of rating a bug. The method comprises reporting the bug to a business entity by an interested party, entering information regarding the bug into a database, assigning a priority number for the bug, calculating a sigma number for the bug using the priority number, evaluating the bug to be fixed using the sigma number, and escalating the bug.

In general, in one aspect, the invention comprises a bug council rating apparatus. The apparatus comprises a database to store the information entered using a graphical user interface, a priority number module configured to generate a priority number, and a sigma number module configured to generate a sigma number.

In general, in one aspect, the invention comprises a computer system to rate a bug. The computer system comprises a processor, a memory, a computer display, and software instructions stored in the memory. The computer system is enabled under control of the processor, to perform reporting the bug to a business entity by an interested party, entering information regarding the bug into a database using a graphical user interface displayed on the computer display, assigning a priority number for the bug, calculating a sigma number for the bug, evaluating the bug to be fixed using the sigma number, and escalating the bug.

In general, in one aspect, the invention comprises a method for computing a priority number of a bug. The method comprises determining the bug severity, determining the bug escalation value, evaluating ease of reproducing a failure caused by the bug, and determining an amount of revenue contributed by a reporting vendor to a business entity. A list of weights is calculated based on the strength of strategic technology. Bug impact on adopting of strategic technology is evaluated. A determination is made a to whether a contractual arrangement exists between the business entity and the reporting vendor. Impact on downstream vendors is determined.

In general, in one aspect, the invention comprises an apparatus for rating a bug. The apparatus comprises means for reporting the bug to a business entity by an interested party, means for entering information regarding the bug into a database, means for assigning a priority number for the bug, means for calculating a sigma number for the bug using the priority number, means for evaluating the bug to be fixed using the sigma number, and means for escalating the bug.

Other aspects and advantages of the invention will be apparent from the following description and the appended claims.

DETAILED DESCRIPTION

Figure 1:
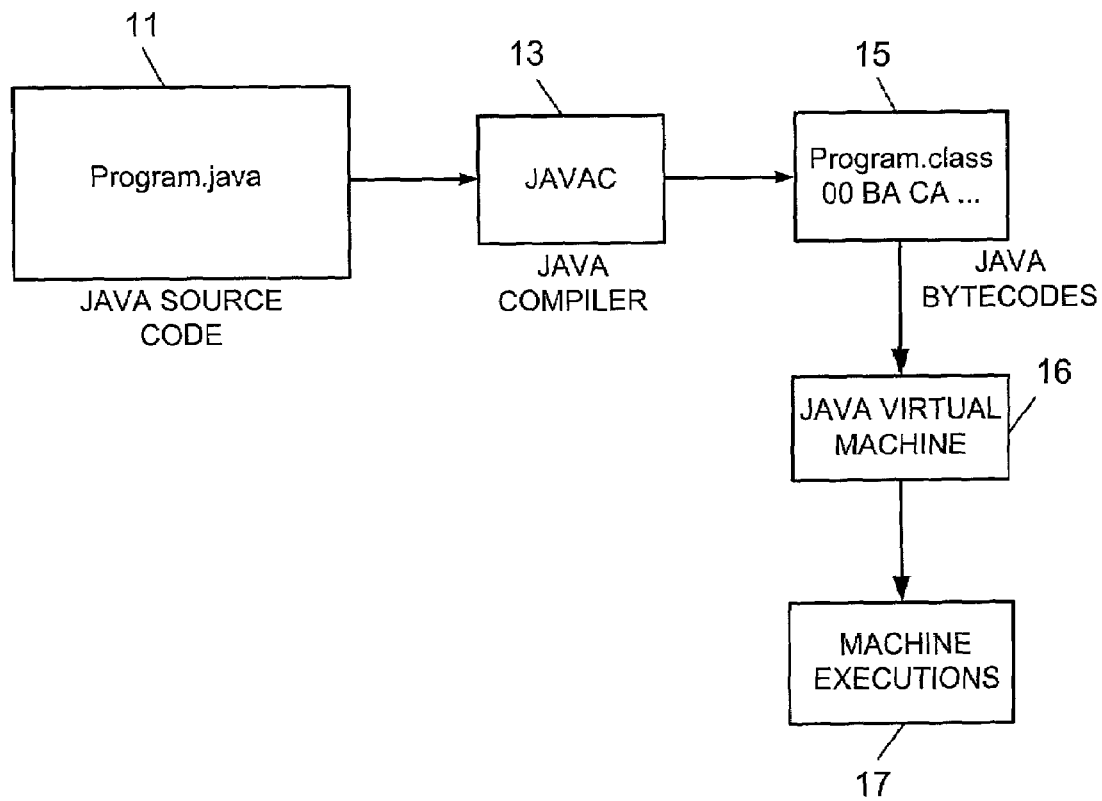
FIG. 1 illustrates the creation of a Java software application.
Figure 2:
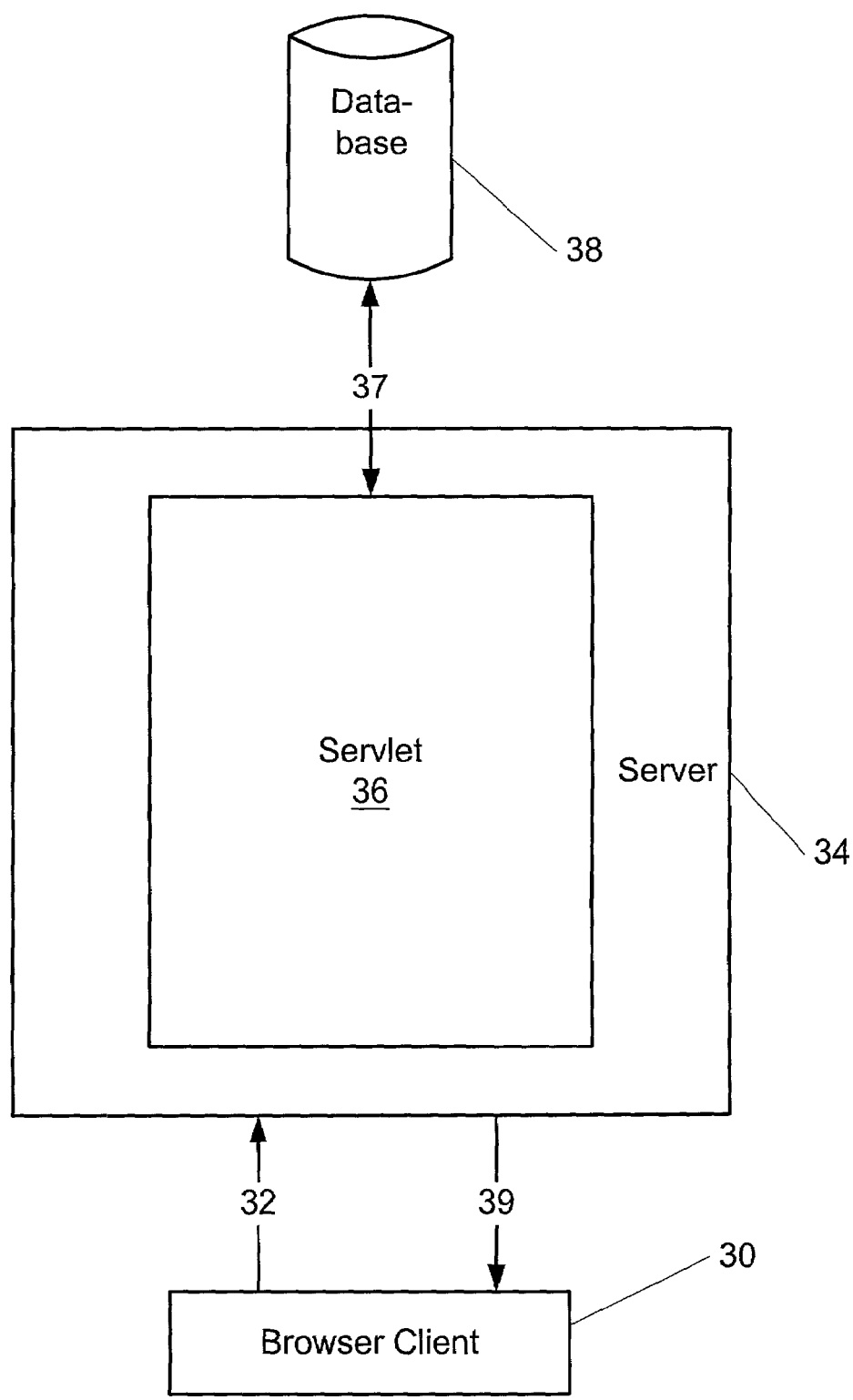
FIG. 2 illustrates a typical sequence of operations between a web browser client, a server, a database, and a servlet.
Figure 3:
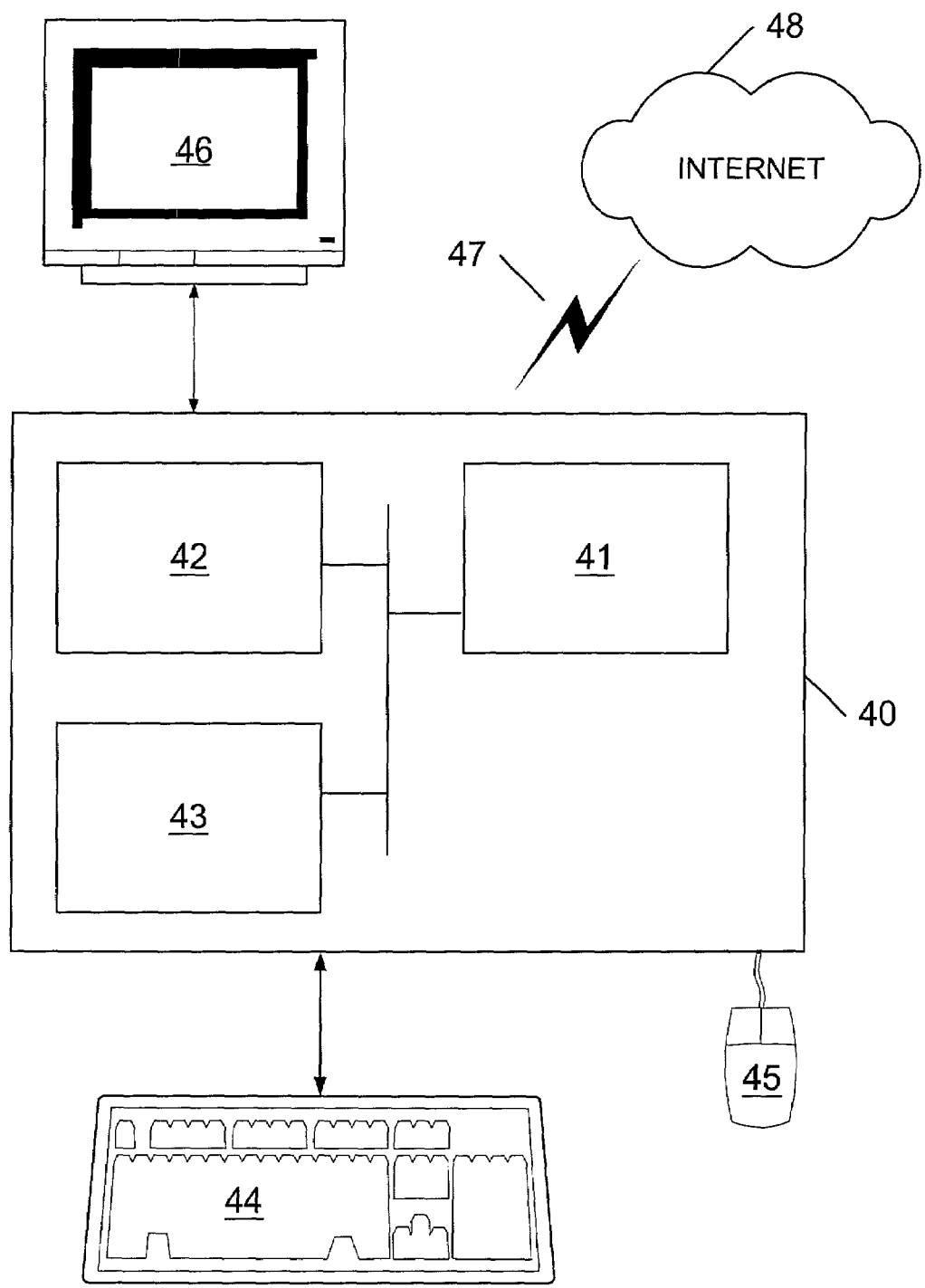
FIG. 3 illustrates a typical computer system connected to the Internet.

The present invention may be implemented on virtually any type computer regardless of the platform being used. For example, as shown in FIG. 3, a typical computer (40) includes a processor (41), a memory (42), a storage device (43), and numerous other elements and functionalities typical of today's computers (not shown). The computer (40) may also include input means, such as a keyboard (44) and a mouse (45), and an output device, such as a monitor (46). Those skilled in the art will appreciate that these input and output means may take other forms in an accessible environment. The computer (40) is connected via a network connection (47) to the Internet (48).

A business entity, such as Sun Microsystems, produces both computer hardware (e.g., Sun Sparc™, Sun Blade™, etc.) and software applications (e.g., Sun Solaris™ operating system, Forte for Java™, various utilities, etc.). Some of the software applications produced by the business entity are designed to operate on the computer hardware produced by that same business entity. Certain ISV's, such as Oracle™, Peoplesoft™, SAP ™, etc., produce third party software applications that run on, or operate in conjunction with, the business entity's hardware and software.

If bugs exist in hardware or software applications, the business entity has the potential to incur negative economic impact due to lost sales, weakened relationships with ISV's, etc. The presence of bugs in hardware or software applications developed and manufactured by the business entity makes developing third party software applications more difficult and less desirable for ISV's. As the availability of third party software applications for the business entity's hardware and software applications decreases, the sales of the business entity's hardware and software applications are adversely affected.

In one or more embodiments of the present invention, a Bug Rating Apparatus addresses the aforementioned concerns by utilizing a rating system. The rating system involves a cost-benefit analysis as applied to a bug; the primary purpose of the rating system is to determine a priority number for the bug. Some primary considerations of the cost benefit analysis that determine the priority number of the bug include (1) the cost to the business entity to fix the bug, and (2) what effect the bug has on the ISV or ISV's (some bugs may hinder third party software applications development more than other bugs). Another consideration is the type of software application in which the bug is found. For example, a bug in an operating system may be fixed before a bug in a browser utility is fixed, because the operating system may be judged to be more strategic for marketing purposes than the browser utility. Another consideration is the ISV or ISV's involved—certain ISV's are more strategic for marketing purposes than other ISV's because of the type of third party software applications produced, or for other strategic reasons. Another cost-benefit analysis consideration is the nature of any contractual relationships between the involved ISV's and the business entity.

Figure 4:
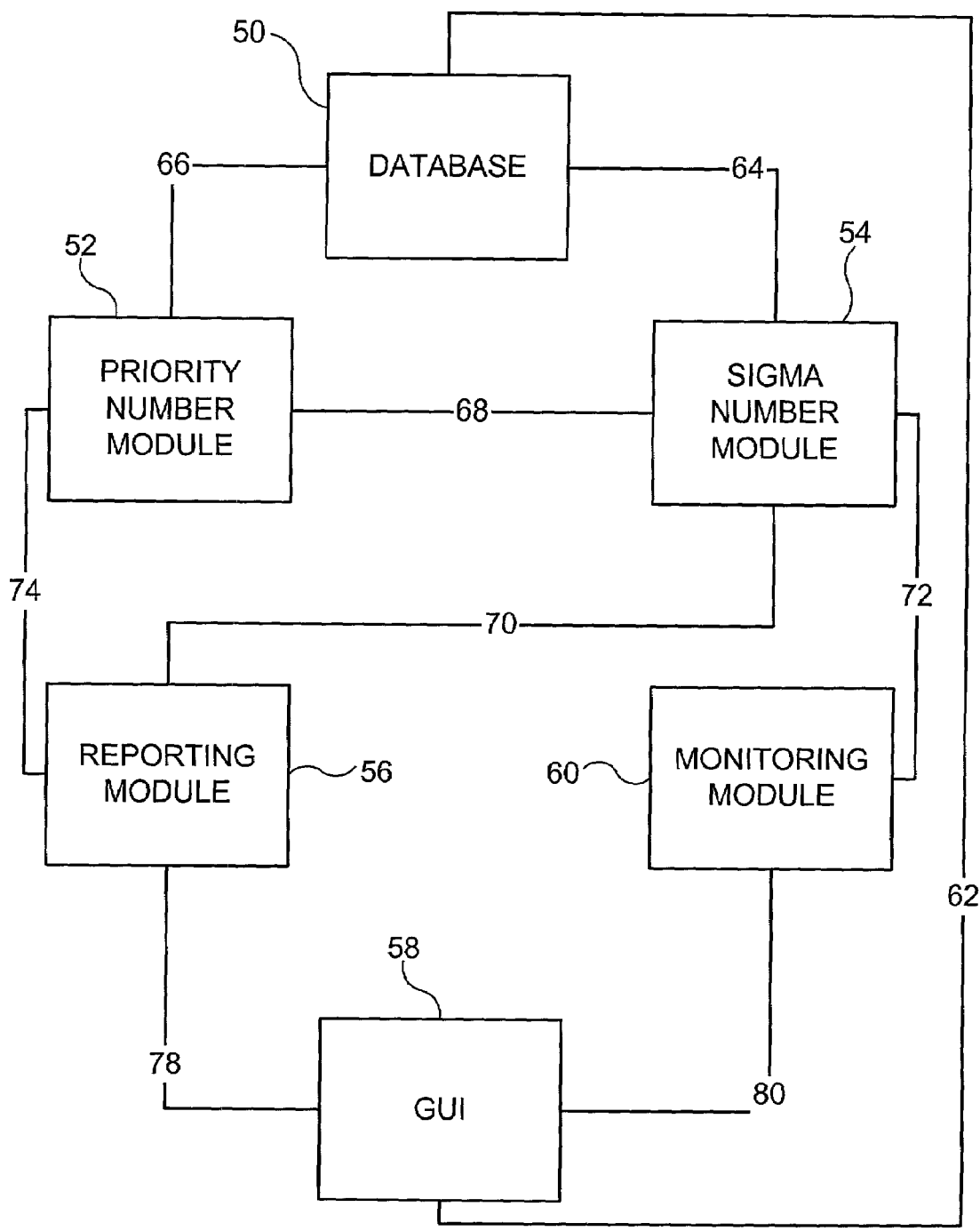
FIG. 4 illustrates interactions involving components of a Bug Rating Apparatus, in accordance with one or more embodiments of the present invention.

The Bug Rating Apparatus as illustrated in FIG. 4 incorporates several components, including a database (50), a priority number module (52), a sigma number module (54), a reporting module (56), a graphical user interface (GUI) (58), and a monitoring module (60). In the course of operations, modules incorporated in the Bug Rating Apparatus generally exhibit certain interactions between the different components. A first interaction (62) involves the database (50) and the GUI (58). A second interaction (64) involves the database (50) and the sigma number module (54). A third interaction (66) involves the database (50) and the priority number module (52). A fourth interaction (68) involves the sigma number module (54) and the priority number module (52). A fifth interaction (70) involves the sigma number module (54) and the reporting module (56). A sixth interaction (72) involves the sigma number module (54) and the monitoring module (60). A seventh interaction (74) involves the priority number module (52) and the reporting module (56). An eighth interaction (78) involves the GUI (58) and the reporting module (56). A ninth interaction (80) involves the GUI (58) and the monitoring module (60). Those skilled in the art will appreciate that there may be fewer or greater interactions than those listed above. Particularly, the GUI (58) interacts with the database (50) by displaying an interface, such as a web page on a web browser, allowing information relating to a bug to be entered. The GUI (58) interacts with the reporting module (56) by displaying the information generated by the modules to an interface, such as a web page on a web browser. Those skilled in the art will realize that, with respect to the matters discussed in this paragraph, a text-based interface may substitute for a GUI.

In order to determine the priority of a particular bug, each bug is evaluated in terms of cost-benefit analysis. The Bug Rating Apparatus assigns a priority number to each bug. The priority number module (52), as shown in FIG. 4, generates a priority number that is used to determine the priority of the bug to be fixed. Potentially, some bugs may receive a priority number that results in the bug not being fixed. As the business entity's actual and potential losses change, so, too, does the priority number of the bug.

The sigma number module (54), as shown in FIG. 4, generates a sigma number for each bug. The sigma number is based in part on the bug's priority number. Another factor in calculating the sigma number is the difficulty of fixing the bug and the impact of the bug on the ISV and the business entity over time. The sigma number dynamically reflects the financial impact on the business entity due to the bug; as time elapses, the financial impact changes, and so, therefore, the sigma number changes in order to reflect the changing financial impact of the bug upon the business entity. At certain threshold sigma number values, alerts may be initiated by the monitoring module (60), as shown in FIG. 4, to ensure the bug receives the proper treatment. For example, bugs with sigma numbers that indicate high potential losses are elevated in priority so that those bugs may be more quickly fixed.

Figure 5:
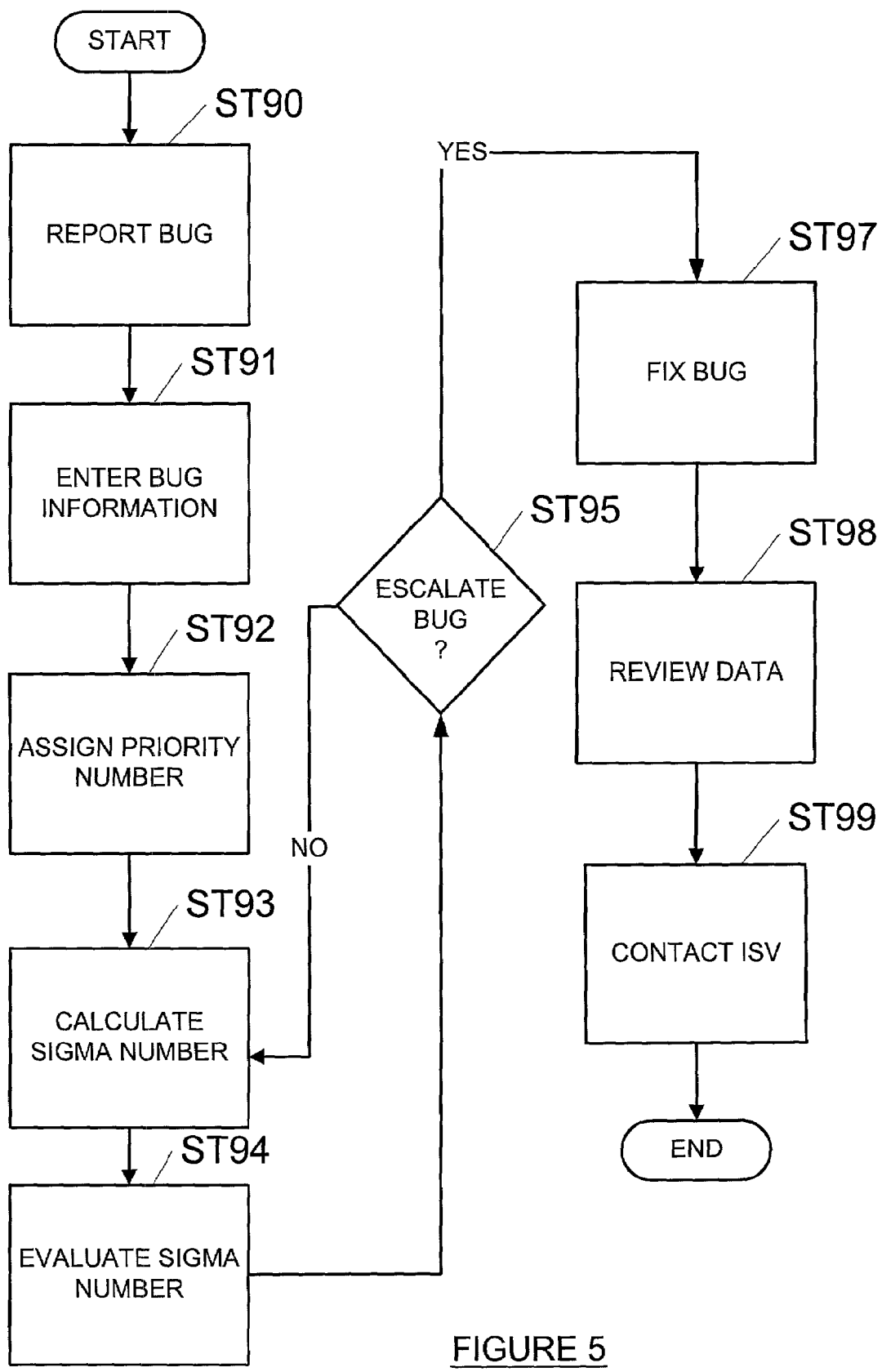
FIG. 5 illustrates a sequence of operations of the Bug Rating Apparatus as applied to a bug, in accordance with one or more embodiments of the present invention.

In one or more embodiments of the present invention, the Bug Rating Apparatus as applied to a bug is represented in FIG. 5. First, an interested party, e.g., a reporting vendor, such as an ISV, reports the bug (Step 90) to an employee of the business entity, such as a bug advocate. The bug advocate then enters information regarding the bug (Step 91) into a database, including such items as (a) the data associated with the bug, (b) the data associated with the reporting ISV, and (c) the data related to the software application in which the bug exists. The priority number is assigned (Step 92) using, among other sources, information regarding the bug in the database. Next, the sigma number is calculated (Step 93) using among other sources, the priority number, information regarding the bug in the database, etc. The sigma number is evaluated (Step 94) to determine a ranking by comparing the sigma number of each sigma in the Bug Rating Apparatus. Based on the ranking done during the evaluation, the bug is either escalated (Step 95) to be fixed (Step 97) or the sigma number is re-calculated (Step 93) until such a point as the bug is escalated to be fixed. If the bug is escalated to be fixed, then an engineer (or some other appropriate party within the business entity) fixes the bug (Step 97). After the bug is fixed, the bug advocate relays the information that the bug has been fixed to a Market Development Engineering (MDE) group, which is an organization that functions as an ISV liaison for the business entity. The MDE group, after appropriate review of the data associated with the bug (Step 98), contacts the ISV (Step 99) in order to obtain feedback as to whether the bug has indeed been fixed to the satisfaction of the ISV.

In one or more embodiments of the present invention, the Bug Rating Apparatus may be implemented manually or may be automated or augmented through the use of software applications or some other mechanism. For example, one possible method of collecting reported bug-related data is via a GUI, such as a web browser.

Figure 6:
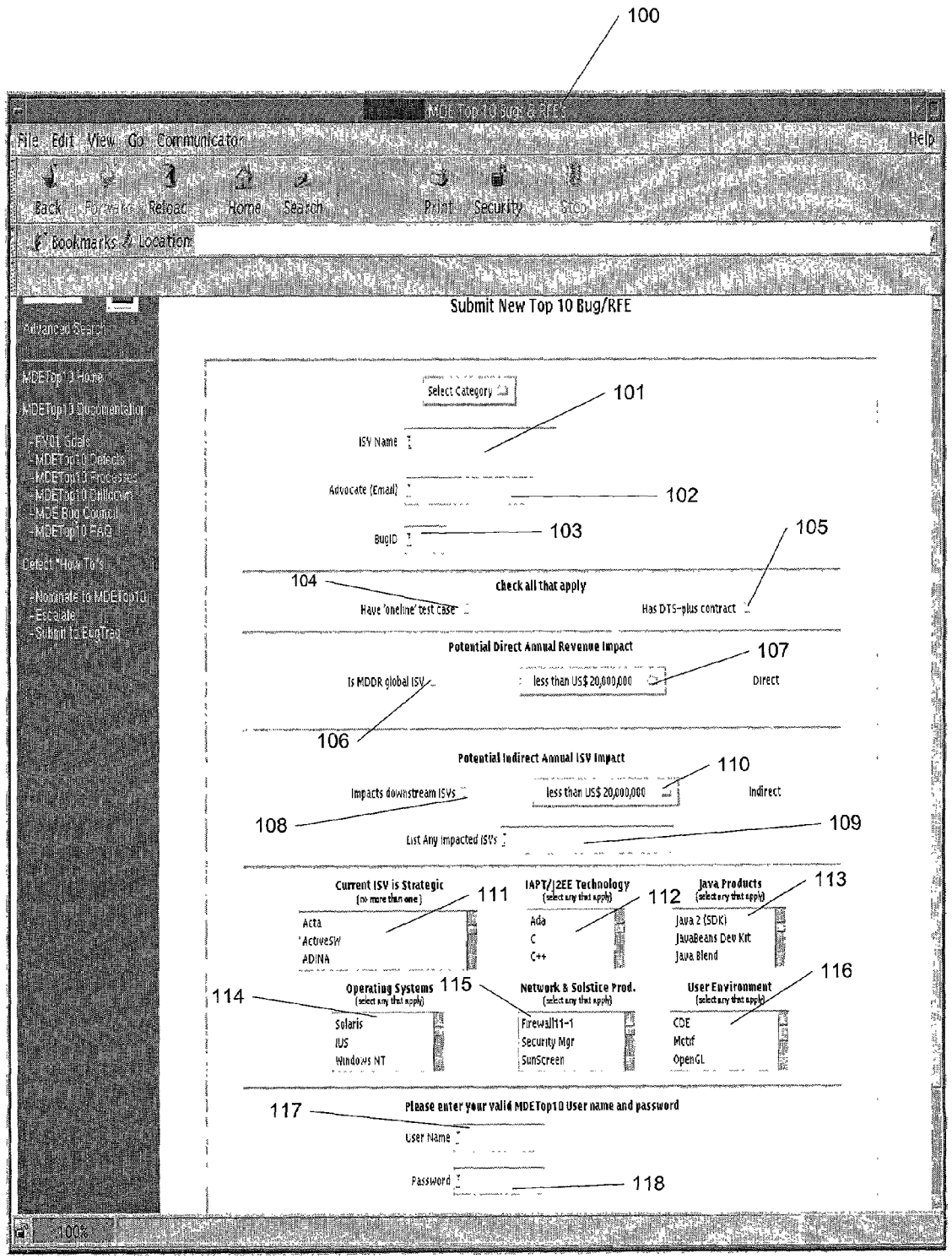
FIG. 6 illustrates a computer screenshot of a collection of bug information via a web browser, in accordance with one or more embodiments of the present invention.

As shown in FIG. 6, the web browser (100) collects data by allowing the bug advocate (or other appropriate party) to enter data into a variety of labeled web browser elements (referred to as "fields", herein). In the top section of the web browser, concerning development of third party software applications, the bug advocate may enter data into fields for the name of an ISV (101) reporting the bug (the reporting ISV), the email for the bug advocate (102), and the BugID (103) (a unique identifier for the bug). The bug advocate may indicate with the one-line test case field (104) whether the bug has a one-line test case addressing the degree to which the failure caused by the bug is easily reproducible. The bug advocate may indicate with the "Has DTS-plus contract" field (105) whether the reporting ISV has a contractual relationship for service with the business entity.

The next section of the web browser, shown in FIG. 6, deals with the potential annual revenue impact of the bug. The bug advocate may use a field, such as the field labeled "Is MDDR global ISV" (106), to indicate whether the reporting ISV contributes a certain amount of money, e.g., at least $100 million per year, towards the business entity's revenue. The bug advocate may use a field, such as the "less than US$20,000,000" field (107), to allow an estimation of the annual revenue due to the bug.

The next section of the web browser, shown in FIG. 6, deals with the annual revenue impact on the business entity due to downstream ISV's affected by the bug. The bug advocate may use a field, such as the field labeled "Impacts downstream ISV's" (108), to indicate whether the bug affects ISV's that create third party software applications which depends upon or work in conjunction with third party software created by the reporting ISV. The bug advocate may enter the names of any affected downstream ISV's in a specified text entry area (109). The bug advocate may use a field, such as the field labeled "less than US$20,000,000" (110), to allow an estimation of the annual revenue lost due to the bug. Those skilled in the art will realize that although large dollar amounts are used herein, dollars amounts both larger and smaller may be used as appropriate for any particular business entity, e.g., for larger or smaller business entities.

The next section of the web browser, shown in FIG. 6, deals with strategic technologies and reporting ISV's. Certain ISV's are deemed to play a strategic marketing role with respect to the business entity's products and services, and so, therefore, bugs reported by those ISV's are elevated in priority. The bug advocate may select a strategic ISV from a list, such as the list labeled "Current ISV is strategic" (111). Bugs in certain technologies are determined to be more important and are accordingly granted higher priority. The bug advocate may select appropriate items from fields, such as the fields labeled "IAPT/J2EE Technology" (112), "Java Products" (113), "Operating Systems" (114), "Network & Solstice Prod" (115), and "User Environment" (116), which allow the bug advocate to indicate what technology or technologies are affected by or involved with the bug.

The bottom section of the web browser, shown in FIG. 6, allows the bug advocate to enter a user name (117) and a password (118). The web browser presentation shown in FIG. 6 may be implemented by a servlet or similar technology in order to allow local use, or remote use over a computer network. The information entered by the bug advocate into the GUI, such as the web browser, becomes part of the bug database holding the bug information.

The process of collecting data associated with a bug may be further automated. For example, data entry by the bug advocate may be minimized by using a software application that performs queries on various databases to gather information. For example, as shown in FIG. 6, the field labeled "Is MDDR global ISV" (106) need not be completed by the bug advocate if a software application is able to access databases containing information that describes the reporting ISV.

Another aspect of the Bug Rating Apparatus that may be augmented using a software application is the reporting functionality of the Bug Rating Apparatus. Bugs with the most loss potential and bugs that involve strategic technology or strategic ISV's are escalated to a list such as an MDE top 10 list of bugs. Other factors, such as the degree of difficulty of fixing the bug, play a role as well. The GUI may be used to display the major bug tracking goals and statistics, such as statistics relating to bug resolution timeframes (how long it takes to fix bugs), etc. The Bug Rating Apparatus allows further analysis of bug-related data through the use of an MDE Top 10 Drilldown report, which may be constructed manually or through some other form, such as a web browser. The MDE Top 10 Drilldown report may itemize bug-related data in terms of the technology in which the bug is found. For example, each row of the report may be linked to a certain technology, and the columns of the report may list such items as the average resolution time for bugs found in the technology, or the resolution rate for bugs found in the technology, etc. The aforementioned reporting functions are encapsulated as part of the reporting module (56) as shown in FIG. 4.

Figure 7:
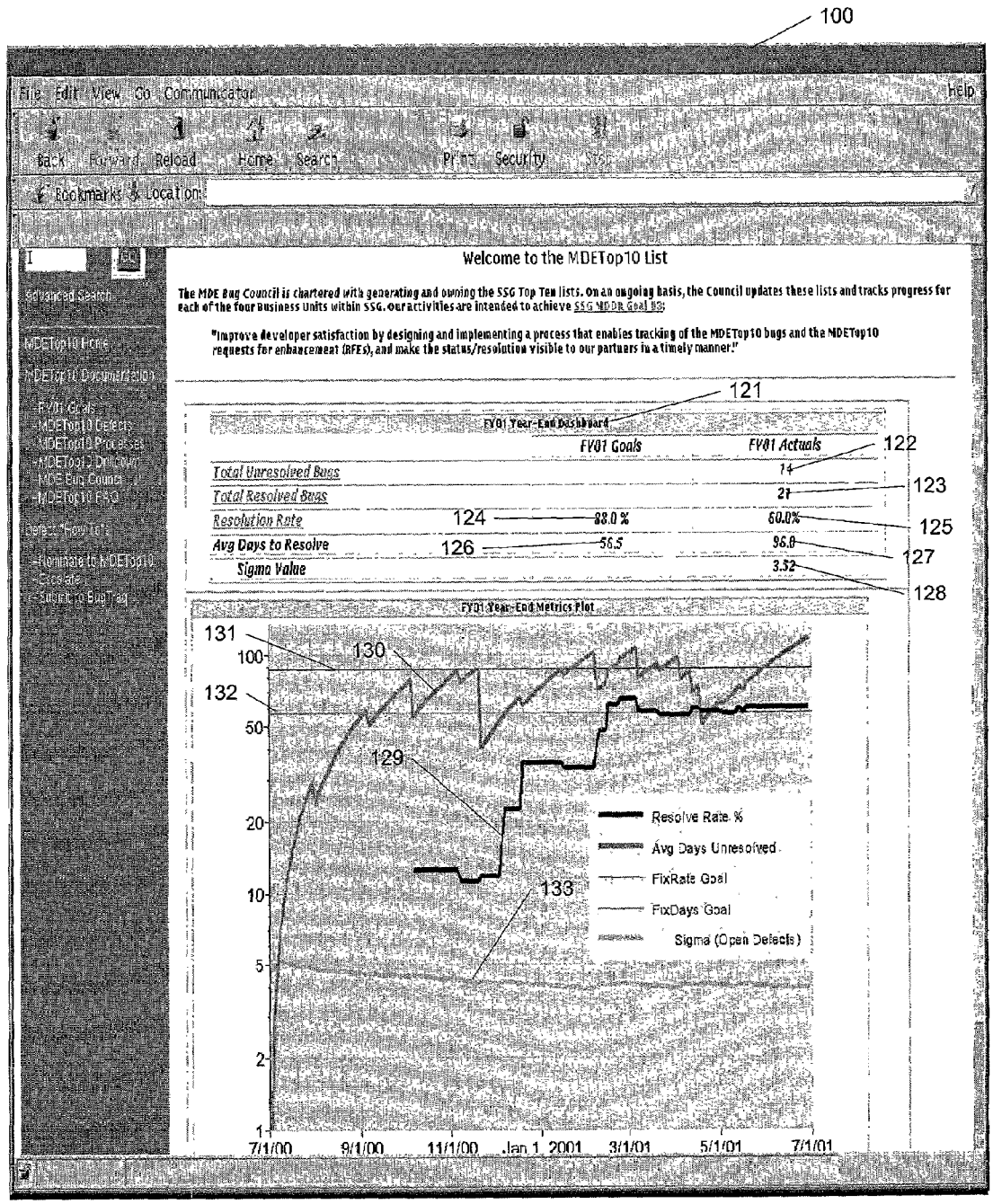
FIG. 7 illustrates a computer screenshot of a display of bug information via a web browser, in accordance with one or more embodiments of the present invention.

In one or more embodiments of the present invention, an implementation of the GUI to augment the reporting functionality of the Bug Rating Apparatus is shown in FIG. 7 in the form of the web browser (100). A Year-End Dashboard (121) displays current values for Total Unresolved Bugs (122), Total Resolved Bugs (123) and compares yearly goals with actual values for Resolution Rate (124, 125), and Average Days to Resolve (126, 127). A sigma value (128) is representative of the sigma number for unresolved bugs. Historical values of Resolve Rate (129) and Average Days Unresolved (130) are graphed, as are goals for the rate of fixed bugs (131) and number of days to fix bugs (132). A graph of the sigma number (133) is based on the sigma number for all unresolved bugs. The list of bugs placed on the MDE top 10 list is updated at a periodic interval, such as twice monthly. The aforementioned reporting and tracking mechanisms are encapsulated as part of the reporting module (56) as shown in FIG. 4.

Figure 8:
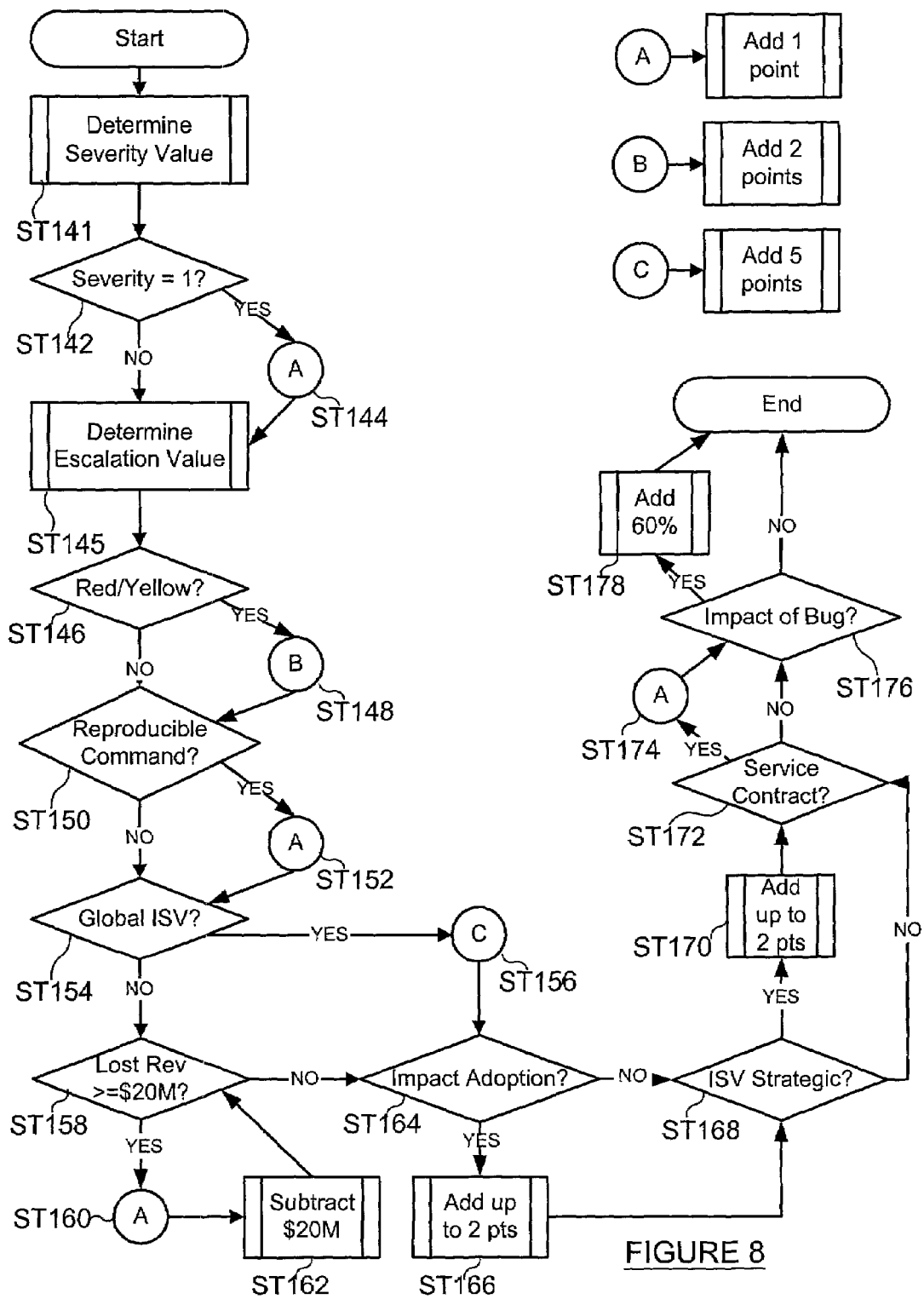
FIG. 8 illustrates a flowchart of a computation process that produces a bug priority number, in accordance with one or more embodiments of the present invention.

Another aspect of the Bug Rating Apparatus that may be automated is the determination of the bug priority number. A software application may be constructed to compute the bug priority number, instead of calculating the bug priority number manually. The flowchart shown in FIG. 8 illustrates the computation process which produces the bug priority number for each bug. The computation process begins with a bug priority number equal to zero points. Next, the bug severity value is determined (Step 141). If the bug severity is equal to one (Step 142), then one point is added (Step 144). Then, the bug escalation value is determined (Step 145). If the associated escalation is Red or Yellow (Step 146), two points are added (Step 148). A Red escalation indicates first highest urgency factor (i.e., there is a need to fix the bug in a time span of hours or days). A Yellow escalation is the second highest urgency factor (i.e., there is a need to fix the bug in a time span of days or weeks). If the bug has a reproducible one-step command/script test case of product failure exemplifying an ease of reproducing the failure caused by the bug (Step 150), one point is added (Step 152).

A next step in the computation process asks whether the reporting ISV is a global ISV (Step 154) (a global ISV is an ISV that contributes a large number of dollars (e.g., $200,000) annually to the revenue of the business entity). If the reporting ISV is indeed a global ISV, then five points are added for ISV lost revenue due to the bug (Step 156). If the reporting ISV is not a global ISV, then for a set number of every additional dollars of revenue lost by the ISV (Step 158) (e.g., $20 million) above the initial number, one point is added (Step 160, Step 162).

A next step in the computation process asks if the bug impacts adoption of the business entity's strategic technology (Step 164). A list of weights is calculated and consulted for the various technologies of the business entity in order to obtain a weight. The computation process adds up to two points if strategic technology is impacted (Step 166). A next step adds up to two points if the involved ISV is deemed to be strategic (Step 168, Step 170). Again, a list of weights is calculated and consulted.

If the reporting ISV has a service contract or other contractual arrangement with the business entity (Step 172), one point is added (Step 174). Finally, the effect on downstream ISV's is considered (Step 176). If downstream ISV's are impacted, then a percentage, such as 60% of downstream ISV strategic technology and strategic ISV weightings values is added (Step 178). The output of the computation process is the bug priority number, which is a factor in the sigma number for the bug. The automated version of the top ten bug list may be frequently updated, e.g., daily. Using the automatically-created priority number and information in the database, the calculation of the sigma number may also be calculated automatically. Those skilled in the art will realize that the steps shown in FIG. 8 may be configured and changed in order to fit the needs of an individual business entity. For example, the amounts of points added for any particular step may be adjusted as needed; also, the determination and usage of strategic technologies and business entity relationships may be customized to fit the needs of an individual business entity.

The invention offers the ability to consolidate bug information in the database. The ability to consolidate bug information enhances the ability of the business entity to track the progress of work done on the bug, and thereby saves the business entity money. The use of the sigma number consolidates information regarding financial impact of the bug on the business entity, and thereby saves the business entity money. The invention, with the use of the GUI in conjunction with a web server and a servlet (or other similar technology) operating on a computer network (e.g., the Internet), enhances feedback from interested parties that have information relating to bugs. The invention enhances the cost-benefit ratio of fixing bugs by selecting to be fixed bugs with favorable ratio of cost-to-fix versus benefits-of-fixing. The invention enhances end user satisfaction by facilitating the fixing of bugs in the business entity's products.

What is claimed is:

1. A method of rating a bug, comprising:
reporting the bug to a business entity by an interested party;
entering information regarding the bug into a database;
assigning a priority number for the bug;
calculating a sigma number for the bug using the priority number;
evaluating the bug to be fixed using the sigma number; and
escalating the bug.

2. The method of claim 1, further comprising:
fixing the bug;
relaying information concerning a fixed bug to the interested party; and
obtaining feedback regarding the fixed bug from the interested party.

3. The method of claim 1, further comprising:
assigning the priority number automatically.

4. The method of claim 1, further comprising:
calculating the sigma number automatically.

5. The method of claim 1, further comprising:
performing queries on the database to gather information on the bug.

6. The method of claim 1, further comprising:
reporting progress and results of the bug evaluation.

7. The method of claim 6, wherein the reporting is displayed using a graphical user interface.

8. The method of claim 1, further comprising:
initiating alerts at certain threshold sigma numbers.

9. The method of claim 1, wherein the information regarding the bug is entered using a graphical user interface.

10. The method of claim 1, wherein evaluating the bug relies upon a cost benefit analysis.

11. The method of claim 1, wherein the sigma number dynamically reflects the impact of the bug on the business entity over time.

12. The method of claim 1, wherein the information entered into the database comprises data associated with the bug, data associated with a reporting vendor, and data related to a software application with the bug.

13. The method of claim 1, wherein escalating the bug comprises ranking the bug and setting an order of significance.

14. A method of rating a bug, comprising:
reporting the bug to a business entity by an interested party;
entering information regarding the bug into a database;
assigning a priority number for the bug;
calculating a sigma number for the bug using the priority number;
evaluating the bug to be fixed using the sigma number;
escalating the bug;
fixing the bug;
relaying information concerning a fixed bug to the interested party;
obtaining feedback regarding the fixed bug from the interested party;
assigning the priority number automatically;
calculating the sigma automatically;
performing queries on the database to gather information on the bug;
reporting progress and results of the bug evaluation; and
initiating alerts at certain threshold sigma numbers.

15. A bug council rating apparatus, comprising:
a database to store the information entered using a graphical user interface;
a priority number module configured to generate a priority number; and
a sigma number module configured to generate a sigma number.

16. The apparatus of claim 15, further comprising:
a monitoring module to monitor the value of the sigma number for a bug and initiating alerts at certain threshold sigma numbers; and
a reporting module to produce reports and track the progress of the bug.

17. The apparatus of claim 15, wherein evaluating the bug relies upon a cost benefit analysis.

18. The apparatus of claim 15, wherein the priority number is based on information stored in the database.

19. The apparatus of claim 15, wherein the sigma number is based on the priority number over a period of time.

20. The apparatus of claim 15, wherein the information entered into the database comprises data associated with the bug, data associated with a reporting vendor, and data related to a software application with the bug.

21. A bug council rating apparatus, comprising:
a database to store the information entered using a graphical user interface;
a priority number module generating a priority number based on information stored in the database;
a sigma number module generating a sigma number based on the priority number over a period of time;
a monitoring module to monitor the value of the sigma number for a bug and initiating alerts at certain threshold sigma numbers; and
a reporting module to produce reports and track the progress of the bug.

22. A computer system to rate a bug, comprising:
a processor;
a memory;
a computer display; and
software instructions stored in the memory for enabling the computer system under control of the processor, to perform:
reporting the bug to a business entity by an interested party;
entering information regarding the bug into a database using a graphical user interface displayed on the computer display;
assigning a priority number for the bug;
calculating a sigma number for the bug;
evaluating the bug to be fixed using the sigma number; and
escalating the bug.

23. The system of claim 22, wherein evaluating the bug relies upon a cost benefit analysis.

24. The system of claim 22, wherein the sigma number dynamically reflects the impact of the bug on the business entity over time.

25. The system of claim 22, wherein the information entered into the database comprises data associated with the bug, data associated with a reporting vendor, and data related to a software application with the bug.

26. The system of claim 22, wherein escalating the bug comprises ranking the bug and setting an order of significance.

27. An apparatus for rating a bug, comprising:
means for reporting the bug to a business entity by an interested party;
means for entering information regarding the bug into a database;
means for assigning a priority number for the bug;
means for calculating a sigma number for the bug using the priority number;
means for evaluating the bug to be fixed using the sigma number; and
means for escalating the bug.

* * * * *